DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 421

T896,027

SUBSTITUTED INDANONES AND INDANDIONES AS ORGANIC PHOTOCONDUCTORS

John A. Ford, Jr., Rochester, and Donald P. Specht, Spencerport, N.Y. (both of Kodak Park, Rochester, N.Y. 14650)

Filed Feb. 24, 1971, Ser. No. 118,496
Int. Cl. G03c *5/06*
U.S. Cl. 96—1.5
No Drawing. 18 Pages Specification

Certain 2-arylidene-1-indanones and 2-arylidene-1,3-indandiones are useful as photoconductors in electrophotographic elements. Typical compounds of this type have the formula:

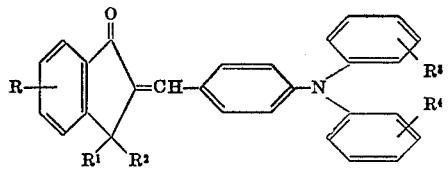

wherein R is a hydrogen atom, an alkylamino radical or a diarylamino radical including substituted diarylamino radicals having such substituents as a halogen atom, an alkyl radical or an alkoxy radical; $R^1$ and $R^2$, when taken separately, each represents hydrogen and when taken together represent an oxo group; and each of $R^3$ and $R^4$ represents a hydrogen atom, a halogen atom, a nitro radical, an alkyl radical, an alkoxy radical and an acylamino radical. Electrophotographic elements are prepared by mixing these photoconductive compounds with a suitable polymeric, film-forming, electrically insulating binder and coating on an electrically conductive support. Various sensitizers can also be used if desired.